United States Patent
Vinals et al.

(10) Patent No.: US 6,565,192 B1
(45) Date of Patent: May 20, 2003

(54) PRINTING WITH MULTIPLE PASSES

(75) Inventors: Lluis Vinals, San Diego, CA (US); Josep Maria Serra, Barcelona (ES)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/506,479

(22) Filed: Feb. 17, 2000

(30) Foreign Application Priority Data

Feb. 17, 1999 (EP) .............................................. 99301171

(51) Int. Cl.⁷ .................................................. B41J 2/15
(52) U.S. Cl. .......................................... 347/41; 347/16
(58) Field of Search ............................. 347/41, 43, 16, 347/15, 40, 12

(56) References Cited

U.S. PATENT DOCUMENTS

| | | | |
|---|---|---|---|
| 5,422,666 A | 6/1995 | Koyama | 347/41 |
| 5,594,478 A * | 1/1997 | Matsubara et al. | 347/41 |
| 5,600,353 A * | 2/1997 | Hickman et al. | 347/43 |
| 5,677,716 A | 10/1997 | Cleveland | 347/37 |
| 6,164,756 A * | 12/2000 | Takahashi et al. | 347/43 |
| 6,213,584 B1 * | 4/2001 | Noyes et al. | 347/43 |

FOREIGN PATENT DOCUMENTS

| | | | |
|---|---|---|---|
| EP | 0 300 743 | 1/1989 | B41J/3/04 |
| EP | 0 526 205 A2 | 2/1993 | B41J/2/505 |
| EP | 0 564 252 A2 | 10/1993 | H04N/1/18 |
| JP | 10278346 | 10/1998 | B41J/2/51 |

* cited by examiner

Primary Examiner—Lamson Nguyen

(57) ABSTRACT

Multiple-pass printing is performed with no print medium advance between selected pairs of printing passes. In some embodiments, an entire printing operation (20, 30) can be conducted in one multiple-pass mode. Alternatively, a switch from n-pass to m-pass mode may occur during a printing operation (50, 70, 90) but with a uniform print medium advance throughout. Different printing masks are used for the different stages.

12 Claims, 4 Drawing Sheets

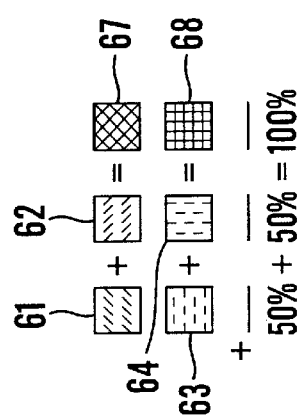
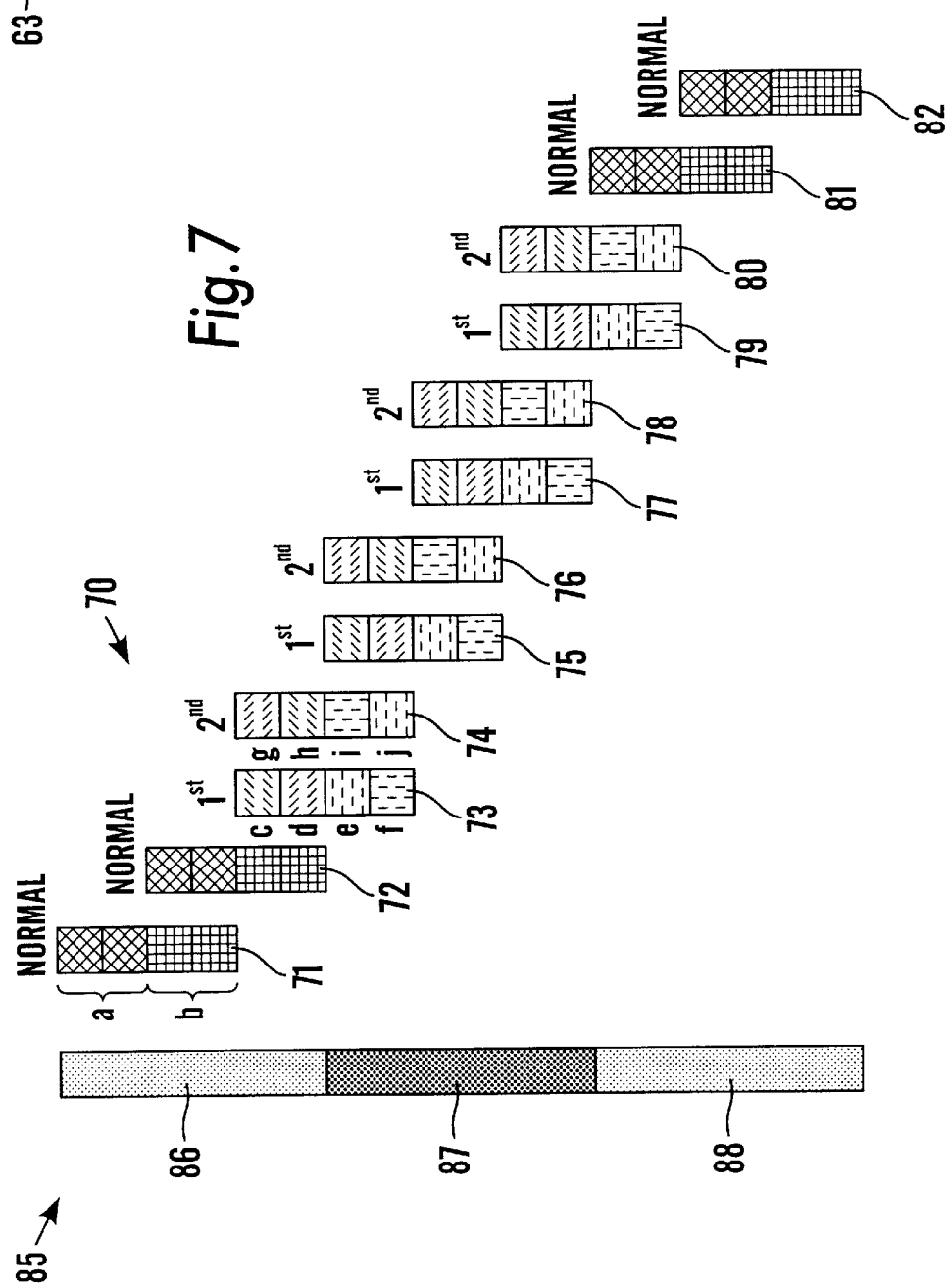

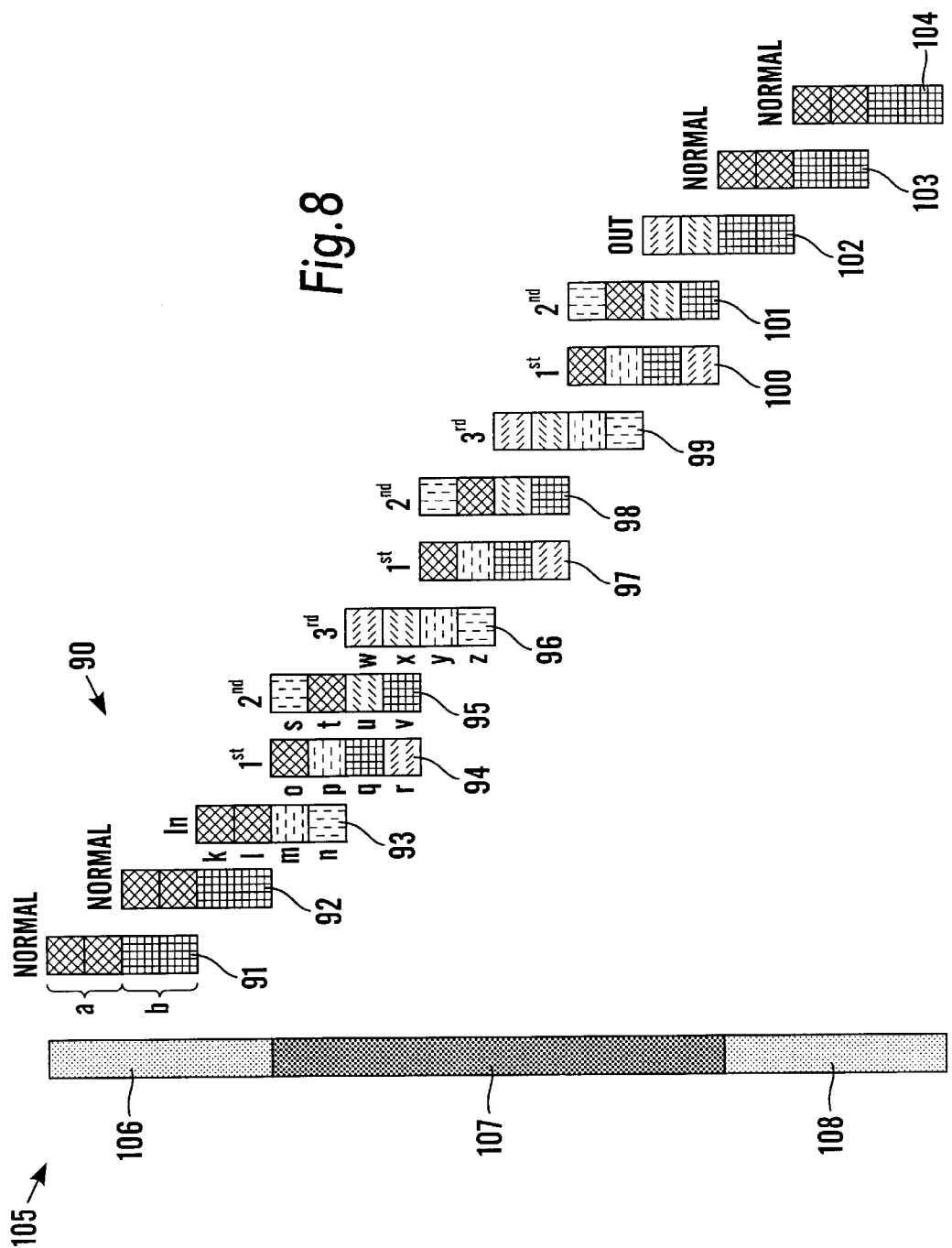

PRINTING WITH MULTIPLE PASSES

The present invention relates to a method of operating printing apparatus, in particular inkjet printers, at least partly in a multi-pass mode, that is one in which a pen or printhead passes more than once over a horizontal band of the print medium. In each pass the printhead deposits a swath having only a fraction of the total ink required in each section of the image, with areas being left unprinted to be filled in during one or more other passes. A detailed account of how multi-pass printing may be achieved is discussed in U.S. Pat. No. 5,677,716.

One of the main limitations of thermal inkjet printing is the self-warming of the printheads due to the firing pulses (energy given to the printhead) needed to eject the ink. This warming can in many cases produce non-desired defects on print quality like thermal banding (big temperature excursions), puddling (printing at high temperature during a long time), or even damage the printhead itself (reaching very high temperatures).

Some of the solutions implemented in previous products set a minimum temperature of the printhead above ambient temperature (warming temperature) to avoid big temperature excursions, and then, depending on the type of object (text or graphics), use one printmode with more or less number of passes to avoid exceeding any unwanted temperature. Another solution is to set a maximum temperature and shut down (stop printing) or pause printing if the measured temperature is above a certain limit. A further solution is to change the carriage speed for different swaths.

To achieve multiple-pass printing, existing products define print modes that advance the print medium by a distance which corresponds to the printhead height divided by the number of passes to be undertaken. U.S. Pat. No. 5,677,716 discloses such an arrangement. In this arrangement, some regions are printed with reduced print medium advance and some regions with no medium advance; however these regions are restricted to the very top and bottom of sheets of print media to compensate for incomplete roller engagement.

EP-A-0863479 discloses a method for multipass printing in which, between each medium advance, a printhead scans in both directions printing, for example, two inks when scanning in a first direction and in two different inks when scanning in the opposite direction.

According to one aspect of the present invention there is provided a method of printing on a print medium with an inkjet printer in a plurality of horizontal swaths in which at least an intermediate region of the medium is printed in a multiple pass mode, characterised in that the passes are arranged in groups of p passes (where p is less than or equal to q, the total number of passes in the mode), no medium advance occurring between the members of each group.

The whole of the print medium may be printed in the multiple pass mode.

In a preferred method, p is equal to q and a full medium advance movement occurs between groups of passes. Such a method provides a good throughput.

In another preferred method, q is equal to r×p, where r is an integer greater than 1, and, between groups of passes, a medium advance movement occurs which is equal to a full medium advance movement divided by n. Such a method provides good print quality.

The integer p is preferably equal to 2. However, it may be greater than 2 if still higher print quality is required, or for other technical reasons.

In other preferred embodiments, the number of passes may be changed during the middle of a printing operation, i.e. "on the fly". The need for this can arise:

(i) when, due to dynamic temperature conditions, a prediction of the temperature of the printhead indicates an unacceptable value: and/or (ii) when printing a file with mixed contents, e.g. graphics or high-density blocks plus text or thick lines, which have differing minimum levels of quality.

Of course, it is possible to print the entire file at the slowed speed/highest quality required, but this reduces throughput.

Some previously-proposed solutions also involve a substantial reduction in throughput since they involve more movements of the print medium and such movements are generally slower than movements of the printer carriage. Other previous solutions involve a high number of different passes and different medium advances, and these add complexity and higher memory needs to the firmware.

According to another aspect of the present invention there is provided a method of printing on a print medium with an inkjet printer in a plurality of horizontal swaths in which at least one first region of the medium is printed with a number n of passes, n being an integer, and at least one second region of the medium is printed with a larger number m of passes, m being an integer greater than 1, characterised in that in the or each second region a plurality of groups of passes occur with no medium advance occurring between the members of the groups.

The groups are preferably pairs of passes. When m is an even number, said plurality of pairs of passes occur in direct succession. When m is an odd number, the pairs of passes have extra passes interspersed between them. In preferred embodiments, the separation of successive pairs corresponds to a full print medium advance movement.

A uniform print medium advance movement is preferably maintained throughout the printing operation.

In one preferred embodiment n=1 and m=2 and the first region is printed using a first printing mask and the transition to the second region comprises the following steps:

printing of the last pass of the first region;

full medium advance;

printing with a second printing mask corresponding to half of an image to be printed;

printing with a third printing mask corresponding to the half of the image to be printed which is complementary to that of the second printing mask;

full medium advance.

The above process is substantially reversed for a transition from the second region to the first region.

In another preferred embodiment n=2 and m=4, and the first region is printed using a first printing mask and the transition to the second region comprises the following steps:

printing of the last pass of the first region;

half medium advance;

printing with a second printing mask having half the printing density of the first printing mask;

printing with a third printing mask having half the printing density of the first printing mask;

half medium advance.

The above process is substantially reversed for transition from the second region to the first region. Preferably the first printing mask comprises a top half (a), corresponding to half the image to be printed, and a bottom half (b), corresponding to the half of the image which is complementary to that of the top half, the second printing mask comprises first to fourth quarters (c, d, e, f) from top to bottom each corresponding to a quarter of the image to be printed, wherein the first and second quarters (c, d) if superimposed would be equivalent to the printing pattern of the top half (a), and the third and fourth quarters (e, f) if superimposed would be equivalent to the printing pattern of the bottom half (b), and the third printing mask comprises first to fourth quarters (g, h, i, j) from top to bottom and respectively corresponding to the second, first, fourth and third quarters of the second printing mask.

In a further preferred embodiment n=2 and m=3 and the first region is printed using a first printing mask and the transition to the second region comprises the following steps:

printing of the last pass of the first region;
half medium advance;
printing of intermediate pass with a second printing mask;
half medium advance;
printing with a third printing mask;
printing with a fourth printing mask;
half medium advance;
printing with a fifth printing mask;
half medium advance.

For a transition from the second region to the first region an intermediate pass is printed using a sixth printing mask. Preferably the first printing mask comprises a top half (a), corresponding to half the image to be printed, and a bottom half (b), corresponding to the half of the image which is complementary to that of the top half, the second printing mask comprises first to fourth quarters (k, l, m, n) from top to bottom, with the first and second quarters (k, l) together duplicating the top half (a), and wherein the third and fourth quarters (m, n) if superimposed would be equivalent to the printing pattern of the bottom half (b), the third printing mask comprises first to fourth quarters (o, p, q, r) from top to bottom with the first to third quarters (o, p, q) respectively corresponding to the printing pattern of the top half (a), the third quarter of the second printing mask and the printing pattern of the bottom half (b), the fourth printing mask comprises first to fourth quarters (s, t, u, v) from the top to bottom with the first, second and fourth quarters (s, t, v) respectively corresponding to the fourth quarter of the second printing mask, the printing pattern of the top half (a) and the printing pattern of the bottom half (b), wherein the fourth quarter (r) of the third mask and the third quarter (u) of the fourth mask if superimposed would be equivalent to the printing pattern of the top half (a), and the fifth printing mask comprises first to fourth quarters (w, x, y, z) from top to bottom and respectively corresponding to the fourth quarter (r) of the third mask, the third quarter (u) of the fourth mask, the third quarter (m) of the second mask and the fourth quarter (n) of the second mask. For the transition from the second region to the first region, the corresponding sixth printing mask comprises first to fourth quarters from top to bottom with the first quarter corresponding to the fourth quarter of the third mask, the second quarter corresponding to the third quarter of the fourth mask, and with the third and fourth quarters together duplicating the bottom half of the first printing mask.

According to a further aspect of the present invention there is provided a printer controlled to operate according to any of the above methods.

Preferred embodiments of the present invention will now be described, by way of example only, with reference to the accompanying drawings, of which:

FIG. 6 is a diagram useful in explaining FIGS. 7 and 8;

FIG. 7 illustrates an arrangement in accordance with a fourth embodiment of the present invention for changing from a two-pass to a four-pass printing mode and back again; and FIG. 8 illustrates an arrangement in accordance with a fifth embodiment of the present invention for changing from a two-pass to a three-pass printing mode and back again.

Figure 1:
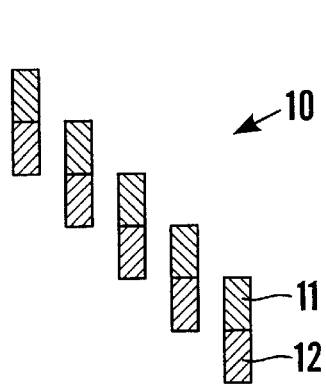
FIG. 1 illustrates a prior art arrangement for two-pass printing.

Although the Figures show relatively narrow bands of multiple-pass printing, these are for explanation only and in practice the bands will be broad enough to cover the whole region required, e.g. the extent of an image. Moreover, certain reference numerals have been used to represent both passes and types of printing mask, but the meaning is clear from the context. Also, references to an image to be printed are for convenience only, and embrace any text or line drawings to be reproduced.

Referring to the drawings, FIG. 1 shows a typical prior art two-pass print mode 10. The passes have a common print mask, the top half 11 of which applies half of the image and the bottom half 12 of which applies the complementary half. It will be noted that there is a print medium advance between each pass corresponding to the pen height divided by the number of passes. Thus, in the present case the medium advance is one half the pen height. Due to the increased level of quality required for imaging products sometimes this method of printing is unable to provide enough passes. This is usually due to the printer hardware imposing a minimum on the amount of print medium advance.

Figure 2:
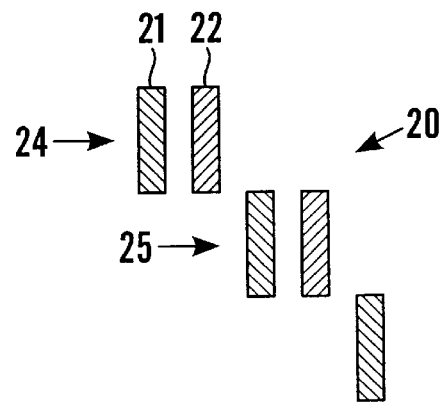
FIG. 2 illustrates an arrangement in accordance with a first embodiment of the present invention for two-pass printing.

FIG. 2 shows a two-pass print mode 20 in accordance with a first embodiment of the present invention. The same shading convention has been adopted as in FIG. 1, so that print mask 21 applies half the image and print mask 22 applies the complementary half. It will be noted that a first pair of passes 24 is printed with no print medium advance between the members of the pair. This is followed by a full medium advance movement and the printing of the next pair 25 of passes. A full medium advance is one which is equal to the swath height.

This has the advantage that no complex changes are necessary to the control means for the medium advance, i.e. the paper axis servo. Also, throughput is better known because less time is spent on medium advancing movements.

Figure 3:
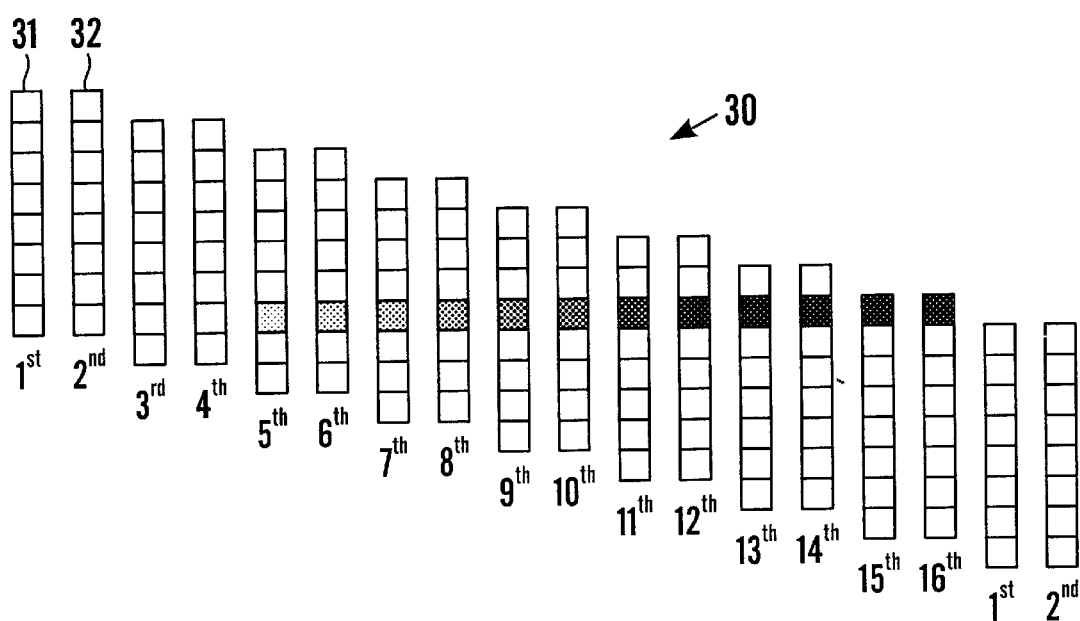
FIG. 3 illustrates an arrangement in accordance with a second embodiment of the present invention for sixteen-pass printing.

One practical large format printer has a minimum print medium advance of one eighth of the pen height. Thus conventional printers would be limited to eight-pass printing. The print mode 30 of FIG. 3 shows how, in accordance with a second embodiment of the present invention, the print quality can be improved by doubling the number of passes for each such advance. As an example, it illustrates how the print density is built up along a horizontal band on the print medium. It will be appreciated that the print masks 31, 32 each have eight sections, and that the total sixteen sections are complementary, so that sixteen passes (=2×8) gives a complete image.

In fact, as many masks as desired may be successively printed in a group, with no print medium advance between the members of the group. Thus, printing quality of any desired level may be readily achieved. Accordingly, by selecting the number of passes made between print medium advance, a desired compromise can be found between printing quality and throughput. Problems which can be solved in this may include:

when there is a thermal limitation of the maximum energy supplied to the printhead;

when there is not enough bandwidth to supply the required data to the printhead;

when coalescence needs to be reduced.

An advantage of the above-described embodiments is that only two printing masks (e.g. 31, 32) are required.

With further embodiments according to the present invention, it is possible to change the number of passes "on the fly" e.g. in the middle of a single printing operation. A prior art printing operation for achieving this, used on Hewlett-Packard Design Jet 750 printers, is shown schematically at 40 in FIG. 4, which represents a change from single-pass printing to double-pass printing and back again. The shading of printing masks 41, 47 and 48 corresponds to printing of the full image, as would be expected with single-pass printing. The shading of printing masks 43, 44 and 45 corresponds to double-pass printing, so that the top half of each mask prints half of the image which is complementary to the other half printed by the bottom half of each mask. However, it is also necessary to provide transition regions as the printing mode changes. Thus between masks 41 and 43, it is necessary to provide a special mask 42, of which the top half is the same as the bottom half of masks 43 to 45, and of which the bottom half does not print. Also, between masks 45 and 47, it is necessary to supply a different special mask 46 as double-pass printing changes to single-pass printing. The top half of mask 46 is similar to the top half of masks 43 to 45, and the bottom half of mask 46 does not print. Thus, to summarise, printing operation 40 prints a band with a thickness equal to five times the pen height using eight passes, four different printing masks (or pass types) and with six print medium advances, some of a full amount and some half-advances, in addition to no advance between masks 42 and 43.

Figure 4:
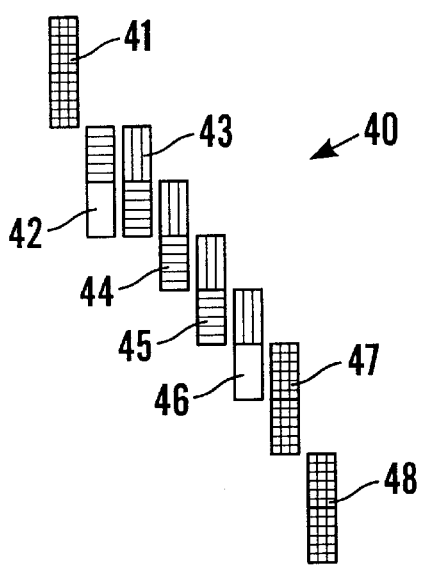
FIG. 4 illustrates a prior art arrangement for changing from single-pass mode printing, to double-pass and back to single-pass.
Figure 5:
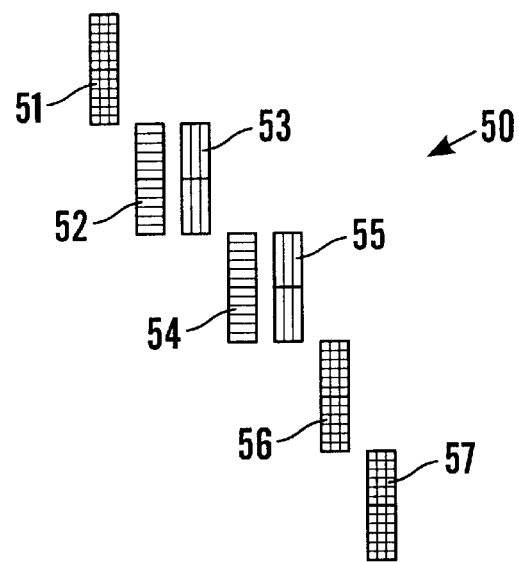
FIG. 5 illustrates an arrangement in accordance with a third embodiment of the present invention for achieving a similar result to the arrangement of FIG. 4.

A printing operation 50 in accordance with a third embodiment of the present invention is shown in FIG. 5. As in FIG. 4, the shading of masks 52, 56 and 57 corresponds to printing of the full image. The shadings of masks 52–55 correspond to a double-pass print mode with masks 52 and 54 printing a half of the image which is complementary to that printed by masks 53 and 55. Full print medium advances occur between masks 51, 52; between masks 53, 54; between masks 55, 56; and between masks 56, 57.

The advantages of this embodiment emerge from a comparison with FIG. 4 since the same five pen height band is achieved with only seven passes, three different printing masks, and four print medium advances, all of full amount. The reduction in the number of passes saves some time, but a much greater shortening of the printing process is achieved by the substantial reduction in the number of medium advances. Also since there is only one type of medium advance (in addition to no advance), the firmware algorithms are simplified and the printer has no additional complexity or memory requirements, e.g. to deal with error hiding. A similar advantage is provided by the reduced number of printing masks which needs to be stored by the printer.

Various modifications can be made to the method of FIG. 5. Any desired number of changes between single and double printing modes can be made during a single printing operation. Moreover, triple-or higher-mode printing can be achieved simply by suitable adaptation of the printing masks and correspondingly increasing the number of passes between print medium advances. For complicated tasks, switching between three or more modes can occur during a single printing operation, whether on a single sheet or on a continuous roll.

There will now be described further embodiments according to the present invention, in which switching occurs between two-pass printing to higher-mode printing and back again. Referring to FIG. 6 there are schematically shown elements of the printing masks employed in the embodiments of FIGS. 7 and 8. Elements 61 and 62 each correspond to a quarter of the image to be printed and together print an output element 67 corresponding to a half of the image. Elements 63 and 64 each correspond to other quarters of the image and together print an output element 68 corresponding to a half of the image complementary to that of element 67. Elements 67 and 68 are equivalent to the elements of two-pass printing.

Referring now to FIG. 7, there is shown a printing operation 70, in accordance with a fourth embodiment, which switches from two-pass printing to four-pass printing and back again. Printing masks 71, 72, 79, 80 correspond to two-pass printing as indicated on scale 85 on the left of FIG. 7 as regions 86 and 88, which typically require less detail and lower printing quality.

The change to four-pass printing involves the introduction of second and third types of printing mask, e.g. 73, 74 respectively. The medium advance movement remains constant at half the pen height, but the pairs of passes 73, 74; 75, 76; and 77, 78; are applied with no medium advance between the members of each pair. This enables higher printing quality to be achieved as indicated in region 87 of scale 85.

The medium advance also remains constant in the transition region between two- and four-pass printing, but a narrow band occurs at the bottom of region 86 which is covered in three passes. A similar transition occurs at the top of region 88 as four-pass printing changes to two-pass printing.

The embodiment of FIG. 7 has the advantage of only one size of print medium advance. It has the further advantage of requiring only three types of printing mask. The ability to readily change from one multipass to another multipass print mode is particularly important in large formal printers, where typically a high number of passes are used for graphics and imaging. However, it is equally applicable to small format printers, which are increasingly being required to produce high quality photographic images.

Various modifications may be made to the embodiment of FIG. 7. In particular, it can be readily extended to handle the transition from two-pass mode to any mode with an even number "s" of passes. In each case half the number "s" of passes are made with no medium advance. (Also, in each case there will be a narrow transition region involving an intermediate number of passes equal to ½ (s+2). Of course, the printing masks 73 to 78 will need to be changed as necessary.

If desired the initial number of passes may be increased from two to any even number.

Referring now to FIG. 8, there is shown a printing operation 90, in accordance with a fifth embodiment, which switches from two-pass printing to three-pass printing and back again. Printing masks 91, 92, 103, 104 correspond to the corresponding masks of FIG. 7 and correspond to two-pass printing as indicated on scale 105 on the left of FIG. 8 as regions 106 and 108.

The change to three-pass printing involves, inter alia, the introduction of three additional types of printing masks, e.g. 94, 95 and 96. The medium advance movement again remains constant a half the pen height. There is still no advance between the individual members of pairs of passes such as 94 and 95, but the pattern of advance movements changes as follows, viz between pair 94, 95; pass 96; passes 97, 98; pass 99; and passes 100, 101. These correspond to region 107 of scale 105. The medium advance also remains constant in transition regions at the top and bottom of region 107, but two further printing masks 93 and 102 are required upon entry to and exit from the triple-pass region respectively. Each of the printing masks 93, 102 is immediately preceded by a medium advance and immediately followed by a medium advance.

The arrangement of FIG. 8 has the advantages of a uniform medium advance movement throughput. Although not all passes in region 107 are arranged in pairs 94, 95 etc., between the members of which there is no medium advance, there is still a substantial saving in time compared to arrangements in which there is a medium advance after every pass. Moreover, although more printing masks are needed than for the arrangement of FIG. 7, this number is still only six.

The arrangement of FIG. 8 can also be extended to a higher odd number of passes within region 107. The number of passes in regions 106, 108 can also be increased as desired. The number of passes in a group, between the members of which there is no medium advance, may be three or more.

What is claimed is:

1. A method of printing on a print medium with an inkjet printer in a plurality of horizontal swaths comprising:
    printing at least one first region of the medium with n number of passes, n being an integer;
    printing at least one second region of the medium with a larger number of passes m, m being an integer greater than 1, wherein, in said at least one second region a plurality of groups of passes occur with no medium advance occurring between individual passes of said plurality of groups of passes.

2. A method according to claim 1 wherein the groups are pairs of passes.

3. A method according to claim 1, wherein n=1 and m=2, and wherein the first region is printed using a first printing mask and the transition to the second region comprises:
    printing of the last pass of the first region;
    full medium advance;
    printing with a second printing mask corresponding to half of an image to be printed;
    printing with a third printing mask corresponding to the half of the image to be printed which is complementary to that of the second printing mask; and
    full medium advance.

4. A method according to claim 1, wherein n=2 and m=4, and wherein the first region is printed using a first printing mask and the transition to the second region comprises:
    printing of the last pass of the first region;
    half medium advance;
    printing with a second printing mask having half the printing density of the first printing mask;
    printing with a third printing mask having half the printing density of the first printing mask; and
    half medium advance.

5. A method according to claim 4 wherein the first printing mask comprises a top half, corresponding to half the image to be printed, and a bottom half, corresponding to the half of the image which is complementary to that of the top half, wherein the second printing mask comprises first to fourth quarters from top to bottom each corresponding to a quarter of the image to be printed, wherein the first and second quarter if superimposed would be equivalent to the printing pattern of the top half, and the third and fourth quarters if superimposed would be equivalent to the printing patter of the bottom half, and wherein the third printing mask comprises first to fourth quarters from top to bottom and respectively corresponding to the second, first, fourth and third quarters of the second printing mask.

6. A method according to claim 1, wherein n=2 and m=3, and wherein the first region is printed using a first printing mask and the transition to the second region comprises:
    printing of the last pass of the first region;
    half medium advance;
    printing with a third printing mask;
    printing with a fourth printing mask;
    half medium advance;
    printing with a fifth printing mask; and
    half medium advance.

7. A method according to claim 4, wherein the first printing mask comprises a top half, corresponding to half the image to be printed, and a bottom half, corresponding to the half of the image which is complementary to that of the to half, wherein the second printing mask comprises first to fourth quarters from top to bottom, with the first and second quarters together duplicating the top half, and wherein the third and fourth quarters if superimposed would be equivalent to the printing pattern of the bottom half, wherein the third printing mask comprises first to fourth quarters from top to bottom with the first to third quarters respectively corresponding to the printing pattern of the top half, the third quarter of the second printing mask and the printing pattern of the bottom half, wherein the fourth printing mask comprises first to fourth quarters from top to bottom with the first, second and fourth quarters respectively corresponding to the fourth quarter of the second printing mask, the printing pattern of the top half and the printing pattern of the bottom half, wherein the fourth quarter of the third mask and the third quarter of the fourth mask if superimposed would be equivalent to the printing pattern of the top half, and wherein the fifth printing mask comprises first to fourth quarters from top to bottom and respectively corresponding to the fourth quitter of the third mask, the third quarter of the fourth mask, the third quarter of the second mask and the further quarter of the second mask.

8. A method of printing on a print medium with an inkjet printer in a plurality of horizontal swaths comprising:
    printing an intermediate region of the medium in a multiple pass mode, wherein q equals the total number of passes in the mode, the passes are arranged in groups of p passes where p is less than q, and no medium advance occurs between individual passes of each group of passes.

9. A method according to claim 8 wherein p is equal to q and wherein a full medium advance movement occurs between groups of pairs.

10. A method according to claim 8 wherein q is equal to r×p, wherein r is an integer greater than 1, and, between groups of passes, a medium advance movement occurs which is equal to a full medium advance movement divided by r.

11. A method according to claim 8, where p is equal to 2.

12. A printer having means arranged to control printing in accordance to claim 8.

* * * * *